United States Patent
Rolston

(10) Patent No.: US 9,586,677 B2
(45) Date of Patent: Mar. 7, 2017

(54) AIRCRAFT WING WITH SYSTEM ESTABLISHING A LAMINAR BOUNDARY LAYER FLOW

(71) Applicant: EADS UK LIMITED, London (GB)

(72) Inventor: Stephen Rolston, Bristol (GB)

(73) Assignee: AIRBUSGROUP LIMITED, London (GB)

( * ) Notice: Subject to any disclaimer, the term of this patent is extended or adjusted under 35 U.S.C. 154(b) by 100 days.

(21) Appl. No.: 14/419,617

(22) PCT Filed: Aug. 6, 2013

(86) PCT No.: PCT/GB2013/052098
§ 371 (c)(1),
(2) Date: Feb. 4, 2015

(87) PCT Pub. No.: WO2014/023951
PCT Pub. Date: Feb. 13, 2014

(65) Prior Publication Data
US 2015/0191244 A1  Jul. 9, 2015

(30) Foreign Application Priority Data
Aug. 8, 2012 (GB) .................................. 1214199.0

(51) Int. Cl.
*B64C 21/10* (2006.01)
*B64C 21/06* (2006.01)
(Continued)

(52) U.S. Cl.
CPC ................ *B64C 21/06* (2013.01); *B64C 9/24* (2013.01); *B64C 21/08* (2013.01);
(Continued)

(58) Field of Classification Search
CPC ....... Y02T 50/32; Y02T 50/166; B64C 21/06; B64C 2230/22; B64C 9/24; B64C 21/08
See application file for complete search history.

(56) References Cited

U.S. PATENT DOCUMENTS

| 3,288,399 A | 11/1966 | Gaster | |
| 5,037,044 A * | 8/1991 | Seyfang | .................. B64C 23/06 244/198 |

(Continued)

FOREIGN PATENT DOCUMENTS

| EP | 0267023 A2 | 5/1988 | |
| EP | 2662282 A2 * | 11/2013 | ............... B64C 9/24 |

(Continued)

OTHER PUBLICATIONS

Nov. 19, 2012—(GB) Search Report—App GB1214199.0.
Nov. 21, 2013—(WO) International Search Report—App No. PCT/GB2013/052098.

*Primary Examiner* — Brian M O'Hara
*Assistant Examiner* — Assres H Woldemaryam
(74) *Attorney, Agent, or Firm* — Banner & Witcoff, Ltd.

(57) ABSTRACT

For establishment of a laminar attachment line flow, an aircraft wing includes a leading edge including an attachment line, where air impinging on the region flows in a boundary layer spanwise along the leading edge. The leading edge and the attachment line are at least partially formed at first and second slats. The second slat is located adjacent to the first slat in the downstream direction of the attachment line flow, so that the leading edge includes a slat-to-slat junction, where a slat cavity is formed. A duct has a duct entrance at the slat-to-slat junction for receiving spanwise flow along the leading edge of the wing. The duct entrance extends around the leading edge and over the range of positions of the attachment line at the slat-to-slat junction.

7 Claims, 3 Drawing Sheets

(51) Int. Cl.
 *B64C 9/24* (2006.01)
 *B64C 21/08* (2006.01)
(52) U.S. Cl.
 CPC ......... *B64C 2230/22* (2013.01); *Y02T 50/166* (2013.01); *Y02T 50/32* (2013.01)

(56) References Cited

U.S. PATENT DOCUMENTS

| | | | | |
|---|---|---|---|---|
| 5,544,847 | A | * | 8/1996 | Bliesner ................... B64C 9/24 244/214 |
| 2001/0032907 | A1 | * | 10/2001 | Borchers ................. B64C 21/10 244/199.1 |
| 2004/0195462 | A1 | | 10/2004 | Malmuth et al. |
| 2007/0194179 | A1 | * | 8/2007 | Giamati ................... B64C 9/24 244/134 D |
| 2009/0314898 | A1 | * | 12/2009 | Ferrari ..................... B64C 3/58 244/214 |

FOREIGN PATENT DOCUMENTS

| | | |
|---|---|---|
| GB | 1600454 A | 10/1981 |
| GB | 2324351 A | 10/1998 |
| WO | 2008075106 A1 | 6/2008 |

* cited by examiner

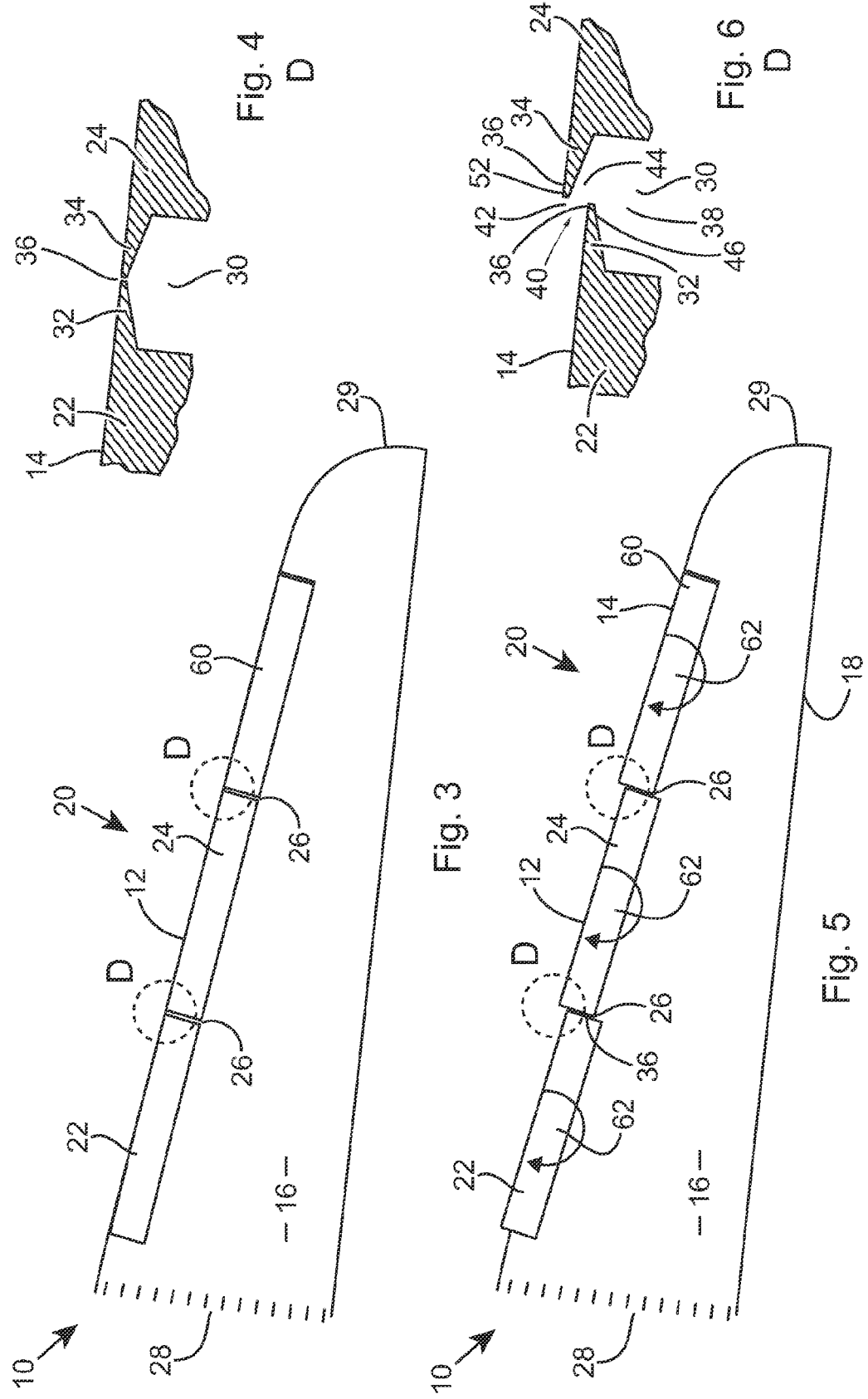

AIRCRAFT WING WITH SYSTEM ESTABLISHING A LAMINAR BOUNDARY LAYER FLOW

CROSS REFERENCE TO RELATED APPLICATIONS

This application is a National Stage Application under 35 U.S.C. 371 of co-pending PCT application number PCT/GB2013/052098, filed 6 Aug. 2013; which claims priority to GB1214199.0, filed 8 Aug. 2012, each of which are hereby incorporated by reference in their entireties.

BACKGROUND

Aspects of the invention relate to an aircraft wing. In particular, aspects of the invention relate to an aircraft wing having a system or device for establishment of laminar boundary layer flow on said wing.

The wing of a conventional aircraft has movable devices called slats positioned along the leading edge of the wing to improve high lift performance. The slats are retracted in the cruise phase of the flight. At the leading edge of an aft swept wing—which is typical for transonic aircraft—there is a spanwise flow from wing root to tip above which the air flows over the upper surface and below which the air flows over the lower surface. This flow is known as the attachment line flow. The presence of the leading edge slats or other types of movable high lift devices, e.g. droop nose devices, introduces surface discontinuities (steps and gaps) on the leading edge in the spanwise direction. The presence of these discontinuities means that the spanwise attachment line flow will be turbulent (rather than laminar) in the cruise flight phase.

Up to now, aircraft slats are designed so that in a slat-to-slat junction these surface discontinuities are as low as possible and that a smooth leading edge is provided. For example, slat seals are used in a junction area between adjacent slats.

It is known in the art that turbulences at the attachment line flow can disturb a boundary layer flow over an airfoil. It is especially referred to U.S. Pat. No. 3,288,399 describing an arrangement in which a shaped "bump", having a bluff front end and an inclined rearward surface, is fitted to the leading edge. The bluff front creates a stagnation region whereby a laminar boundary layer is established on the rearward surface. Successful relaminarisation of a turbulent attachment line flow has been demonstrated using such known "bump" device in both wind-tunnel and flight experiments. However, such a bump only works provided the attachment line position on the leading edge is fixed during the cruise. This is the case for a fin, which has been shown in a laminar flow flight test using Airbus A320, but not for a wing, as the attachment line position changes with aircraft lift and aircraft weight.

Laminarisation of a turbulent leading edge flow can also be achieved by surface suction to a porous skin. However, porous surfaces are expensive to manufacture, have complications relating to cleaning and icing, and may have a weight penalty due to the required pipe-work. Examples for such active suction systems can be found in U.S. Pat. No. 6,216,982 B1 and EP 1 744 952 B1. Such suction systems normally are active systems that need a further pump or suction mechanism.

EP 2 091 814 B1 relates to a system for establishment of laminar boundary layer flow on an airfoil body which system is a passive system without use of additional pump means. This proposes a kind of "bleeding slot". It is proposed to mount a plate to the leading edge. This plate forms—together with the airfoil leading edge region—a duct having a duct entrance for receiving spanwise flow along the leading edge of the airfoil body; a duct entrance extends around the leading edge and over the range of positions of the attachment line. Along the spanwise edges of this plate, duct exits are formed. Hence, this plate functions in flight such that attachment line flow air is drawn through the duct entrance and led upwards or downwards. Hence, a turbulent attachment line flow can be relaminarized.

Such a kind of plate as known from EP 2 091 814 B1 has been successfully tested; however, there are concerns about the integration of this plate onto the leading edge, its tolerance to damage, and the impact of the device on ice growth.

SUMMARY

It is an object of the invention to provide an aircraft wing having a plurality of slats and being configured to enable a relaminarization of turbulent attachment line flow in a safe, cost-effective and simple manner.

According to a preferred aspect of the invention, it is proposed to modify the slat geometry locally in the slat-to-slat junction to enable a laminar attachment line to be created and/or maintained in the spanwise direction.

Especially, the invention provides according to one aspect thereof an aircraft wing comprising:
  a leading edge, the leading edge including an attachment line being a region where air impinging on the region flows in a boundary layer spanwise along the leading edge,
  a first slat and a second slat, wherein the leading edge and the attachment line are at least partially formed at the first and second slats, wherein the second slat is located adjacent to the first slat in the downstream direction of the attachment line flow, so that the leading edge includes a slat-to-slat junction, wherein a slat cavity is formed at the slat-to-slat junction beneath a skin area of at least one of the first and the second slats forming a part of the leading edge, and
  a duct having a duct entrance at the slat-to-slat junction for receiving spanwise flow along the leading edge of the wing, the duct being at least partly formed by said slat cavity, wherein the duct entrance extends around the leading edge and over the range of positions of the attachment line at the slat-to-slat junction.

Preferably, a slat lip of the second slat, which slat lip extends at the slat-to-slat junction transverse to the leading edge, protrudes in the chordwise direction over an adjacent slat lip area of the first slat so that a step is formed between the first and second slats wherein said duct entrance comprises an orifice in said step.

Preferably, said skin area defining the slat cavity comprises said slat lips of at least one of the slats or is constituted by such slat lips. The slat lip area of the first slat may comprise an indentation for forming said step, said orifice being formed between said indentation and said slat lip of the second slat.

Preferably, the leading edge lines of the first and the second slats are offset to each other in a chordwise direction when seen in thickness direction of the wing for forming said step in the slat-to-slat-junction.

Preferably, said first and second slats are movable relatively to each other wherein the slat lip of the second slat is movable relatively to the adjacent lip area of the first slat in chordwise direction in order to change the entrance area of said orifice.

Preferably, said duct comprises a duct exit formed at a slat lower surface trailing edge, and said duct entrance comprises a slot in a leading edge skin surface of the second slat at the slat-to-slat junction wherein the slot communicates with the slat cavity and extends in the wing thickness direction.

The duct may be configured as a passive boundary layer flow influencing device such that, during flight, an air pressure lower than the air pressure at the leading edge is established within the duct so that air is drawn through the duct entrance without the use of a pump mechanism.

Preferably, the aircraft wing is an aft swept wing with an inboard slat as first slat and an outboard slat as second slat, but it may also be a forward swept wing with an outboard slat as the first slat and an inboard slat as the second slat.

According to some embodiments, the outboard edge of the inboard slat has a depression that exposes the inboard edge of the outboard slat. This inboard edge of the outboard slat is shaped to allow a laminar attachment line flow to form.

When compared to conventional designs of slat-to-slat junctions of a conventional air-wing, slat seals can be repositioned or modified to allow for some air to flow under the inboard edge of the outboard slat, which air can be exhausted onto the wing lower surface along the slat lower surface trailing edge, for example.

Rather than having a depression, a further embodiment proposes to slightly rotate the slats about a vertical axis (axis directed in a thickness direction of the aircraft wing) to expose the inboard edge of the outboard slat.

According to still another embodiment, an alternative concept is to incorporate a slot into at least one of the slats to allow for air flow to create a laminar attachment line.

The drag (and therefore fuel consumption) of the aircraft can be reduced by ensuring that the attachment line flow is laminar. The drag benefit or drag reduction may be in the order of 0.5-1.5% of the total aircraft drag without the device.

The proposed embodiments exploit the existing features of the slat structure without having to add an additional plate as required by EP 2 091 814 B1. By having an integrated design, there is no issue of managing the discontinuity of the plate with the leading edge surface. The integrated design is more tolerant to damage. Ice growth can be avoided using the existing slat thermal ice protection system.

Especially, aspects of the invention relate to a new slat design for laminar flow.

BRIEF DESCRIPTION OF THE DRAWINGS

Embodiments of the invention will be described, by way of example only, with reference to the accompanying drawings, wherein

FIG. 3 is a top plan view of a conventional aircraft wing having several slats with a conventional slat rigging;

FIG. 4 shows a sectional view of the detail D of FIG. 3 illustrating the slat-to-slat junction area in the conventional slat design;

FIG. 5 is a top plan view of an aircraft wing according to a further embodiment of the invention having slats which are re-rigged by rotation (exaggerated for illustration purposes);

FIG. 6 shows the view similar as in FIG. 4 of the detail D of FIG. 5 illustrating the slat-to-slat junction in the aircraft wing according to the embodiment of the invention.

DETAILED DESCRIPTION

Figures 1, 2:
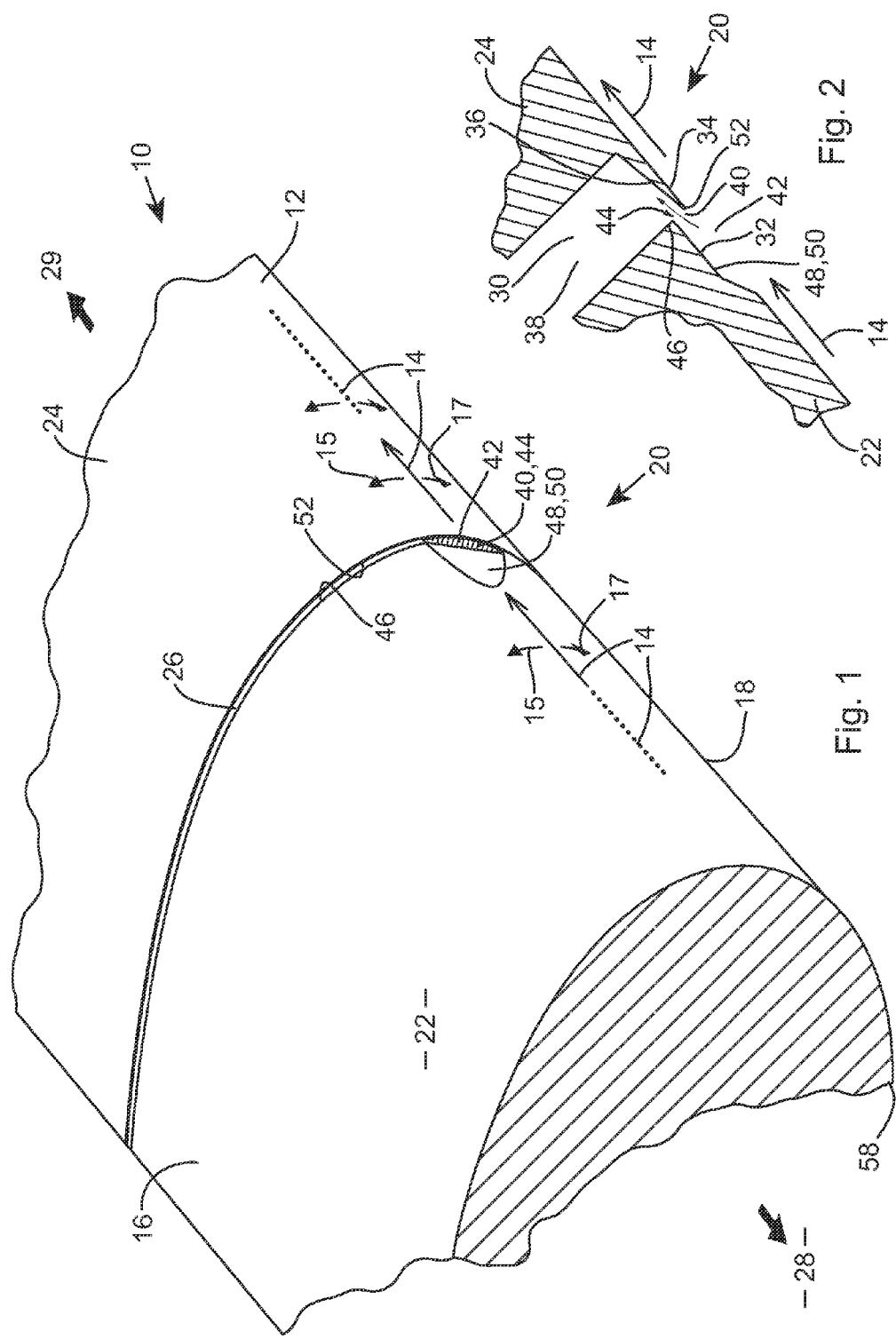
FIG. 1 is a perspective view of a leading edge region of an aircraft wing having a first slat and a second slat and showing a first embodiment of the invention.
FIG. 2 shows a sectional view through a slat-to-slat junction region of the aircraft wing of FIG. 2, taken along an attachment line plane extending in the spanwise and chordwise directions.

FIGS. 1, 2, 5, 6 and 7 show aircraft wings 10 according to embodiments of the invention. The aircraft wings 10 are swept aircraft wings of an aircraft having a leading edge 12 including an attachment line 14. The attachment line 14 is a region where air impinging on the region flows in a boundary layer spanwise along the leading edge 12.

Above the attachment line 14, air 15 flows over the upper surface 16 of the aircraft wing 10. Below the attachment line 14, air 17 flows over the lower surface 18 of the aircraft wing 10. Along the leading edge 12, the aircraft wing 10 has an arrangement 20 of a plurality of slats which are configured to improve highlift performance.

The slat arrangement 20 has at least a first slat 22 and a second slat 24 with a slat-to-slat junction 26 therebetween.

As indicated in FIG. 5, the slat arrangement 20 may have more than two slats, such as three, four, five or more slats.

When looking to the attachment line flow that flows along the leading edge 12 from the wing root 28 in a spanwise direction to the tip 29 of the aircraft wing 10, a first slat 22 which is located more inboard, nearer to the wing root 28, can also be referred to as "inboard slat" or as "upstream slat", while the second slat 24, which is located adjacent to the first slat 22 downstream in the direction of the attachment line flow, can be referred to as the or an "outboard slat" or "downstream slat".

In FIG. 2, a sectional view of the area around the slat-to-slat junction 26 is shown. As shown there, the first and second slats 22, 24 have lips 32, 34 extending to each other with the transition line between the slats 22, 24 therebetween wherein a slat cavity 30 is formed beneath these slat lips 32, 34.

The slat lips 32, 34 form a skin area 36 which forms a part of the leading edge 12 of the aircraft wing 10 at the slat-to-slat junction 26.

According to various embodiments of the invention, the slat geometry is modified in the slat-to-slat junction 26 to enable a laminar attachment line to be created or maintained in the spanwise direction.

The slat geometry is configured such that a duct 38 is formed which duct 38 is at least partly formed using the slat cavity 30 and having a duct entrance 40 at or near the slat-to-slat junction 26. The duct entrance 40 extends around the leading edge 12 and over the range of positions of the attachment line 14, as this is in principle explained for another construction in EP 2 091 814 B1.

However, according to the embodiments of the invention, the slat-to-slat junction 26 between a first slat 22 and a second slat 24 is used for forming the duct entrance 40.

A first embodiment is shown in FIGS. 1 and 2. As shown therein, the slat lip 34 of the second slat 24 is protruding in the chordwise direction at the leading edge over an adjacent area of the slat lip 32 of the first slat 22. Hence, a step 42 is formed between the slat lip 34 of the second slat 24 and the slat lip 32 of the first slat 22. The duct entrance 40 comprises an orifice 44 which is formed within this step 42. In the embodiments shown, this orifice 44 is formed between the slat lip 34 of the second slat 24 and the slat lip 32 of the first slat 22 which is depressed or indented in chordwise direction.

As shown in FIGS. 1 and 2, an outboard edge 46 of the inboard slat 22 has a depression 48 or indentation 50 that exposes the inboard edge 52 of the outboard slat 24. This inboard edge 52, formed by the slat lip 34, is configured and shaped to allow a laminar attachment line to form.

Slat seals (not shown) are arranged and positioned such that the orifice 44 is formed to allow for some air to flow under the inboard edge 52 into the duct 38 at least partly formed by the slat cavity 30. This air can be exhausted onto the lower surface 18 along the lower surface trailing edge 58 of at least one of the slats 22, 24.

FIGS. 5 and 6 show an aircraft wing 10 according to a further embodiment of the invention, wherein the step 52 with the orifice 44 is used as well. However, rather than having a depression 48, the slats 22, 24 (and a third slat 60 in this embodiment) are slightly rotated about vertical axes 62.

FIGS. 3 and 4 show a conventional slat rigging wherein the slats 22, 24, 60 are rigged such that their leading edges are in line. FIG. 4 shows a slat-to-slat junction 26 of this conventional slat rigging, it is shown that there is a smooth transition between the slats.

When compared with this conventional slat design, the slats 22, 24, 60 of the embodiment of FIGS. 5 and 6 are rotated about the vertical axes 62 so that the leading edges of the slats 22, 24, 60 are offset to each other in the chordwise direction. Hence, the inboard edges 52 of the outboard slats 24, 60 are protruding in chordwise direction more to the front over the outboard edges 46 of the adjacent inboard slats 22, 24. Hence, the step 42 with the orifice 44 is formed, and the slat cavity 30 functions as duct 38 for establishing a laminar attachment line flow.

According to a special embodiment, the rotation which is illustrated in FIG. 5 can be controlled or initiated by actuators (not shown). Hence, the relaminarization of the attachment line can be switched on or off or can be controlled by changing 25 the step 42 and changing the entrance area of the orifice 44.

Figure 7:
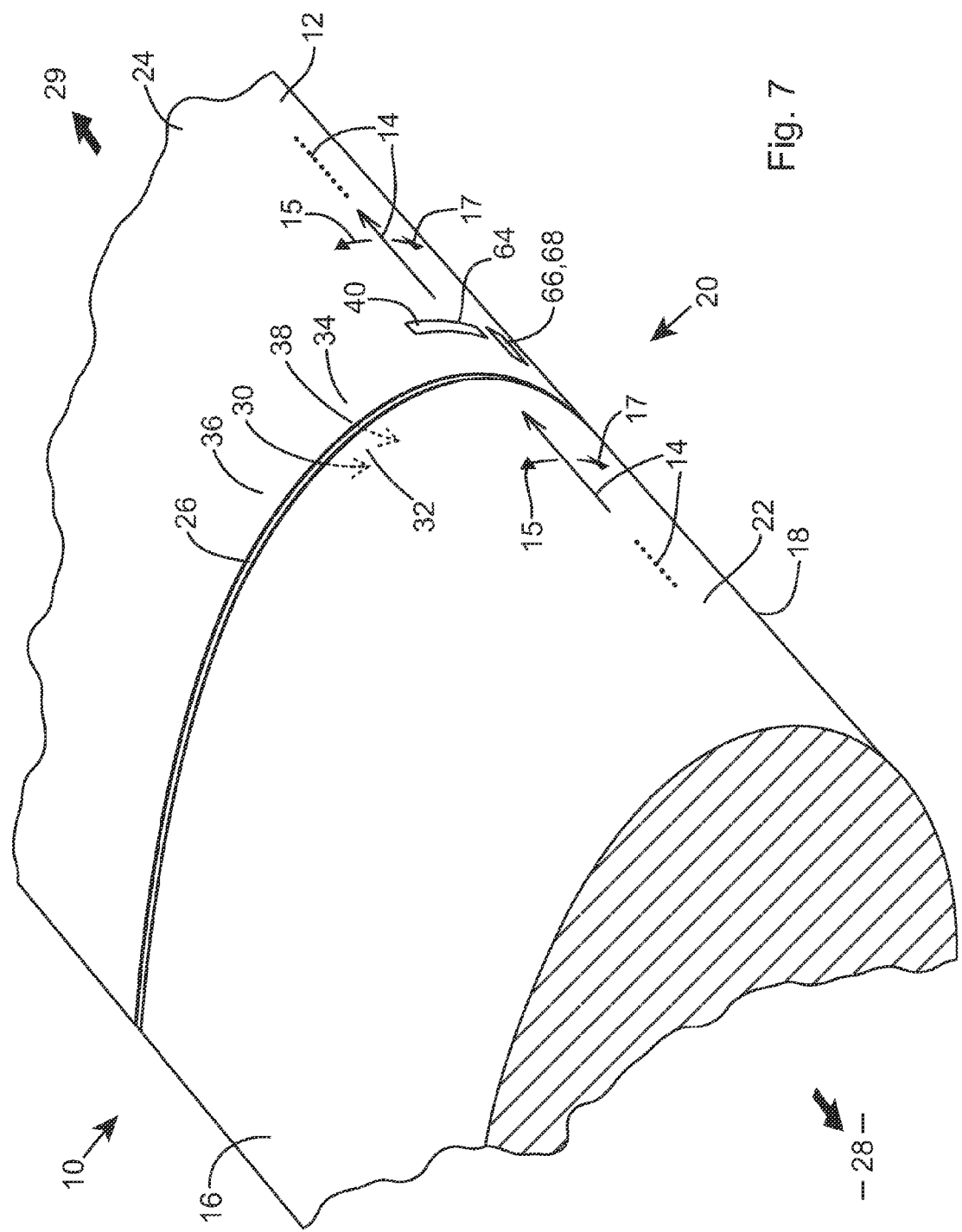
FIG. 7 is a perspective view similar to FIG. 1 showing an aircraft wing according to still another embodiment of the invention.

FIG. 7 shows a third embodiment of the aircraft wing 10. In this embodiment, the duct entrance 40 comprises a slot 64 extending in the thickness direction of the aircraft wing 10 at the slat-to-slat junction 26 in fluid communication with the slat cavity 30. For example, the slot 64 is formed in the second slat 24 (i.e. the outboard slat) so that disturbances caused by the transition between the slats 22, 24 are handled immediately by drawing air through the slot 64.

The slot 64 is a suction slot at the attachment line 14. The suction is driven by natural pressure difference in the slat cavity 30. Hence, a passive relaminarization system is formed thereby without need for additional suction means.

Further, there is shown in FIG. 7 an exhaust slot 66 functioning as a duct exit 68 of the duct 38. The exhaust slot 66 can be inboard or outboard from the suction slot 64.

Alternatively, seals may be arranged to allow the air to exhaust at 58.

Preferably, duct exits 68 are formed such that air drawn into the slat cavity 30 is exhausted onto the lower surface 18.

LIST OF REFERENCE SIGNS

10 Aircraft wing
12 Leading edge
14 Attachment line
15 Air to the upper surface
16 Upper surface
17 Air to the lower surface
18 Lower surface
20 Slat arrangement
22 First slat
24 Second slat
26 Slat-to-slat junction
28 Wing root
29 Wing tip
30 Slat cavity
32 Slat lip
34 Slat lip
36 Skin area
38 Duct
40 Duct entrance
42 Step
44 Orifice
46 Outboard edge
48 Depression
50 Indentation
52 Inboard edge
58 Lower surface trailing edge
60 Third slat
62 Vertical axis
64 Slot
66 Exhaust slot
68 Duct exit

I claim:

1. An aircraft wing comprising: a leading edge, the leading edge including an attachment line being a region where air impinging on the region flows in a boundary layer spanwise along the leading edge; a first slat and a second slat, wherein the leading edge and the attachment line are at least partially formed at the first and second slats, and wherein the second slat is located adjacent to the first slat in a downstream direction of attachment line flow, so that the leading edge includes a slat-to-slat junction; wherein a slat cavity formed at the slat-to-slat junction beneath a skin area of at least one of the first and the second slats; and a duct having a duct entrance at the slat-to-slat junction configured to receive spanwise flow along the leading edge of the wing, the duct being at least partly formed by said slat cavity, wherein the duct entrance extends around the leading edge and over a range of positions of the attachment line at the slat-to-slat junction, wherein the second slat includes a slat lip extending from the slat-to-slat junction transverse to the leading edge, protruding in a chordwise direction over an adjacent slat lip area of the first slat so that a step is formed between the first and second slats, wherein said duct entrance comprises an orifice in said step.

2. The aircraft wing according to claim 1, wherein said slat lip area of the first slat comprises an indentation configured to form said step and said orifice is formed between said indentation and said slat lip of the second slat.

3. The aircraft wing according to claim 1, wherein the first and second slats each includes leading edge lines, wherein said leading edge lines are offset to each other in a chordwise direction when seen in a thickness direction of the wing configured to form said step in the slat-to-slat-junction.

4. The aircraft wing according to claim 1, wherein said first and second slats are movable relative to each other, and wherein the slat lip of the second slat is movable relative to the lip area of the first slat in the chordwise direction in order to change an entrance area of said orifice.

5. The aircraft wing according to claim 1, wherein said duct comprises a duct exit formed at a slat lower surface trailing edge.

6. The aircraft wing according to claim 1, wherein said duct entrance comprises a slot in a leading edge skin surface of the second slat at the slat-to-slat junction, wherein the slot communicates with the slat cavity and extends in a wing thickness direction.

7. The aircraft wing according to claim 1, wherein the duct is configured as a passive boundary layer flow influencing device such that, during flight, an air pressure lower than an air pressure at the leading edge is established within the duct so that air is drawn through the duct entrance without use of an additional suction or pump mechanism.

* * * * *